United States Patent [19]
Fashbaugh et al.

[11] 3,881,776
[45] May 6, 1975

[54] VERMICULATING POLYTOROIDAL THRUSTER

[75] Inventors: Richard H. Fashbaugh, Oxnard; Howard A. Gaberson, Camarillo; Philip L. Stone, Camarillo; Donald E. Williams, Camarillo; John M. Stephenson, Camarillo, all of Calif.

[73] Assignee: The United States of America as represented by the Secretary of the Navy, Washington, D.C.

[22] Filed: Nov. 23, 1973

[21] Appl. No.: 418,332

[52] U.S. Cl. .................. 299/31; 61/45 D; 61/85; 175/94; 180/8 R; 299/33
[51] Int. Cl. .............................................. E01g 3/04
[58] Field of Search ............... 175/19, 94, 230, 62; 299/31, 32, 33; 180/8 R; 254/134, 61, 93 HP; 61/84, 85, 45 D

[56] References Cited
UNITED STATES PATENTS

| | | | |
|---|---|---|---|
| 2,946,578 | 7/1960 | De Smaele | 175/62 X |
| 3,376,942 | 4/1968 | Van Winkle | 175/94 X |
| 3,693,740 | 9/1972 | Lewis et al. | 180/8 R |

FOREIGN PATENTS OR APPLICATIONS

| | | | |
|---|---|---|---|
| 1,104,468 | 4/1961 | Germany | 175/19 |

Primary Examiner—Ernest R. Purser
Attorney, Agent, or Firm—Richard S. Sciascia; Joseph M. St. Amand; David O'Reilly

[57] ABSTRACT

A vermiculating polytoroidal thruster which provides large thrust and braking forces for various devices comprised of a plurality of inflatable bladders mounted on a spool and held in place by end plates. When the bladders are inflated, they squeeze against the inner surface of a tube or tunnel and generate large friction forces for breaking or thrusting. Thrust is provided by vermiculating motion which is generated by inflating one bladder while simultaneously deflating another. A net forward motion is achieved by providing controls for the axial expansion of the bladders. Selective inflation and deflation of certain bladders is controlled by a cycle timer and solenoid valves.

12 Claims, 15 Drawing Figures

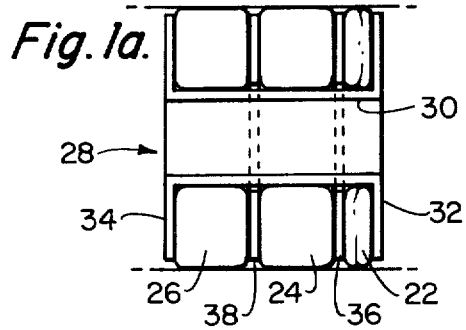
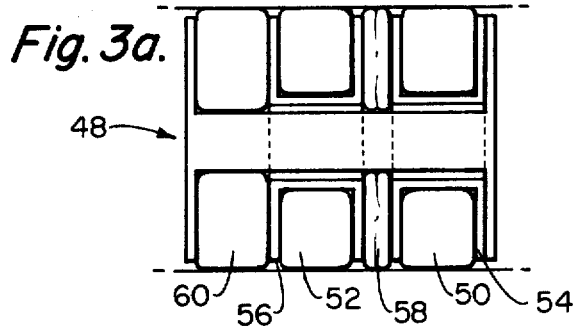
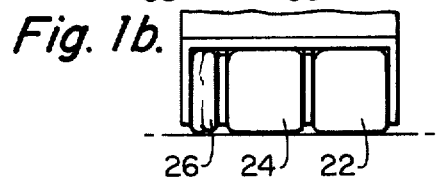
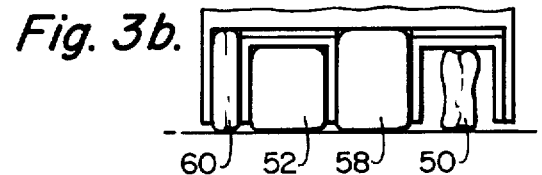
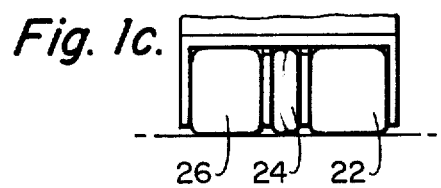
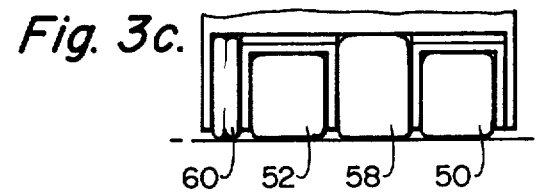
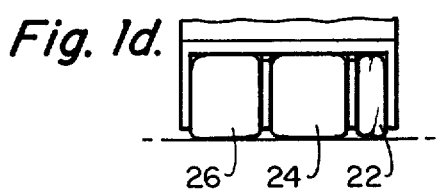
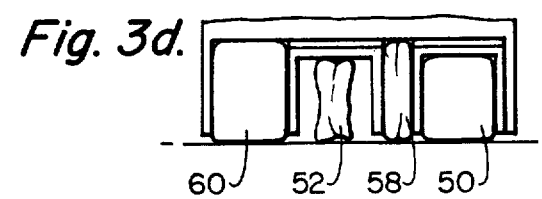
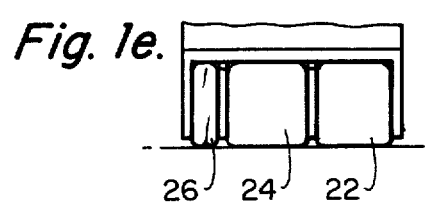
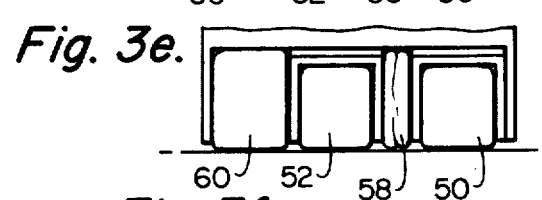
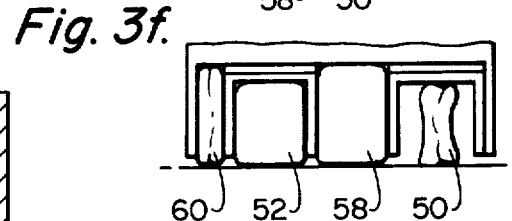
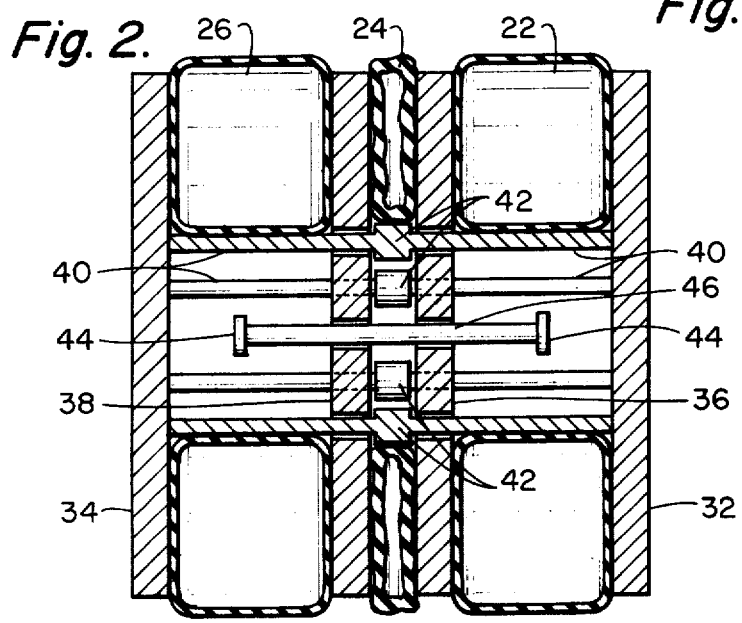

VERMICULATING POLYTOROIDAL THRUSTER

BACKGROUND OF THE INVENTION

This invention relates generally to devices for providing thrust or braking forces for various devices and more particularly to thrust or braking devices which utilize inflatable elements.

Devices which use inflatable elements are known in the art. However, these devices are generally used for raising, carrying, or transporting loads and are not for the purpose of providing thrust or braking. Another type of device which uses inflatable elements is a conveyor which transports goods by a rippling or wave-like motion created by sequential operation of the inflatable elements but, again, no thrust or braking force is generated. One problem with these devices is that little net forward motion is created by the sequential inflation and deflation of the expandable tubes. That is, as pressure is released from one tube, its inflated neighbor would tend to expand and fill the void before an inflating tube could occupy its space. Thus, the net motion per cycle may be negligible. Another potential problem is that a deflated tube can protrude and act as a brake by dragging along the surface. One solution to the latter problem has been provided by special construction of the inflatable elements to make them retract from a surface when deflated. This invention provides a solution to the former problem by limiting the expansion of the inflatable elements, which will be more fully explained hereinafter.

Devices designed to provide thrust or braking commonly have a set of legs which move down while simultaneously slanting or provide braking by hydraulically extendable arms which are forced against two opposing surfaces. These types of devices are most commonly used for tunneling and earth boring. In recent years, considerable effort has been devoted to the development of these machines for boring and tunneling, more commonly referred to as moles. The operation of most moles is similar. Thrust for the cutting head is provided by hydraulic rams. The cutting head is generally a rotating member connected to a cylindrical body containing the drive and thrusting equipment. The braking or reacting force for the cutter thrust is provided by hydraulic jacks or arms which brace between the cylindrical body of the mole and the tunnel wall. Mole direction is generally controlled by adjusting the bracing jacks between advances. Cutting head torque is also absorbed by the bracing jack system.

These moles are very costly. At the present time, they are generally designed for only one job where only one media predominates. They are not flexible devices; that is, a rock mole does not perform effectively in soil. Part of the flexibility problem results from the thrust and propulsion methods used. For example, the bracing jack system is effective when rock is both competent and continuous. It is not effective in soil, and is particularly troublesome when the bracing jacks must push against soft inclusions while the cutter is encountering hard rock.

SUMMARY OF THE INVENTION

The purpose of the present invention is to provide thrust and braking which has a wide variety of applications and is particularly suitable for providing flexibility to tunneling machines (i.e., moles). The thruster assembly disclosed is particularly suitable for use with the tunnel boring machines of the type disclosed in patent application Ser. No. 346,201, filed Mar. 29, 1973 and new U.S. Pat. No. 3,840,270.

In addition to vermiculating motion, this invention incorporates large contact surfaces with low operating pressure to provide large thrust and braking forces. This type of thruster is amenable to penetration through soft soil as well as hard rock. That is, thrust becomes independent of the media. With suitable cutters the mole can become a universal machine rather than a highly specialized one. It should be noted that existing moles with bracing jacks use pressor feet with very high contact pressure. Frequently the media cannot support such pressure and the thrusting capability is impaired.

The polytoroidal thruster of the present invention has a plurality of inflatable bladders on a cylindrical spool held in place by two cylindrical disc-shaped end plates. Vermiculating motion is accomplished by selectively inflating one bladder while simultaneously deflating another in a predetermined sequence. The sequence of inflation and deflation is controlled by a cycle timer which regulates a plurality of solenoid valves. The problem of an inflated bladder expanding axially to occupy the space of a deflated bladder is avoided by restricting this expansion. An inflated bladder provides braking while the inflation of another bladder provides the forward motion or step. In between steps, a sequence of inflations and deflations prepares the polytoroidal thruster for another step advance. The inflatable bladders are supplied with a pressurized gas from a low pressure tank or a compressor.

OBJECTS OF THE INVENTION

It is one object of the present invention to provide a thrusting or braking device which utilizes vermiculating motion.

Another object of the present invention is to provide a thrust or braking device which achieves large forces and assures substantial net forward motion.

Still another object of the present invention is to provide a thrust or braking device suitable for use with tunnel boring machines.

Yet another object of the present invention is to provide a thrusting or braking device for tunnel boring machines which increases their flexibility and makes them capable of more universal use.

Other objects, advantages and novel features of the present invention will become apparent with the following detailed description of the invention when considered in conjunction with the accompanying drawings.

BRIEF DESCRIPTION OF THE DRAWINGS

FIG. 1a is a diagrammatical sectional side elevation of a three bladder configuration of the polytoroidal thruster.

FIGS. 1b–1e are partial sectional side elevations illustrating the operating sequence of the polytoroidal thruster of FIG. 1a.

FIG. 2 is a diagrammatical sectional side elevation of an alternative embodiment of the polytoroidal thruster of FIG. 1a.

FIG. 3a is a diagrammatical sectional side elevation of a four bladder configuration of the polytoroidal thruster.

FIGS. 3b–3f are diagrammatical partial sectional side elevations illustrating the operational sequence of the polytoroidal thruster of FIG. 3a.

DETAILED DESCRIPTION OF THE PREFERRED EMBODIMENT

Figure 4:
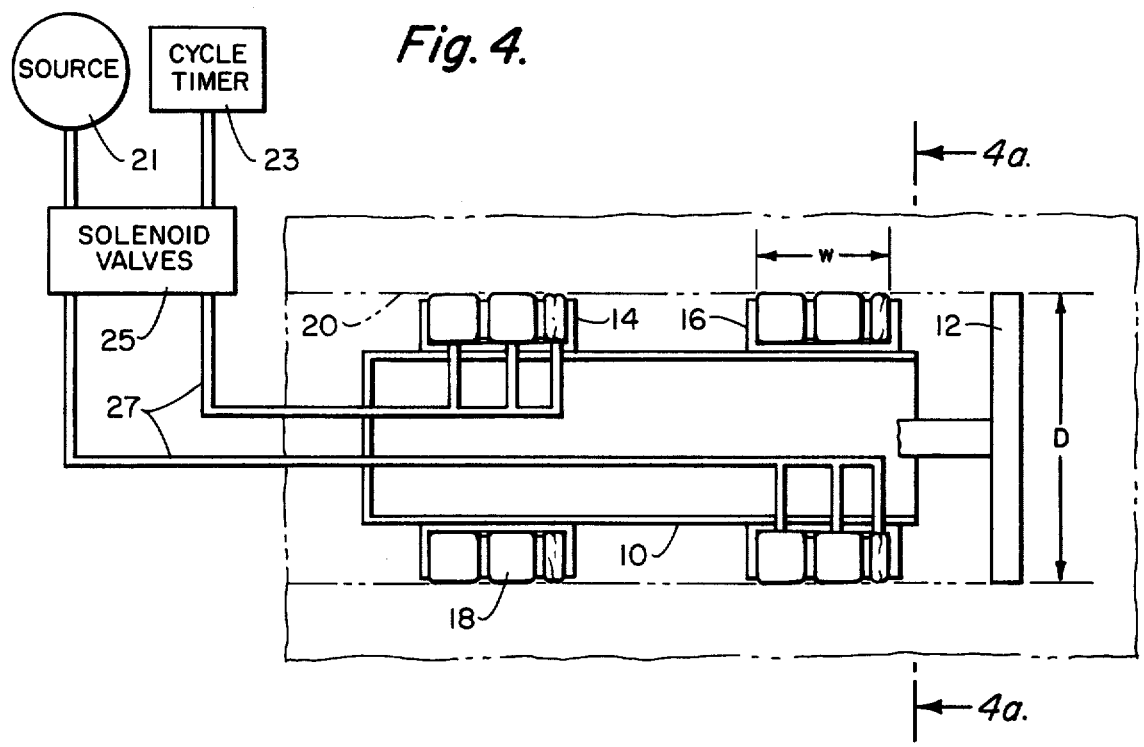
FIG. 4 is a diagrammatical sectional side elevation of a tunnel boring machine employing the polytoroidal thruster.
Figure 4A:
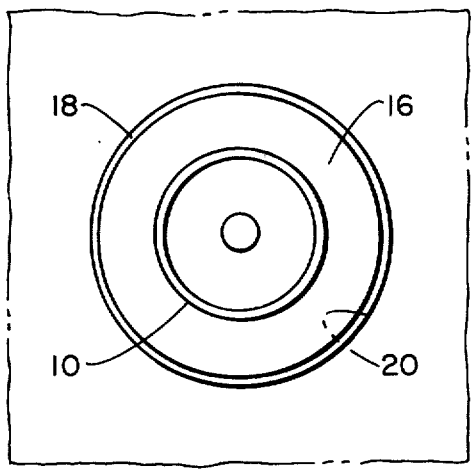
FIG. 4a is a sectional view of FIG. 4 illustrating the toroidal shape of the thruster assembly.

The vermiculating motion concept can best be described by illustration. FIG. 4 shows the polytoroidal thruster being used with a tunnel boring machine having a cylindrical body 10 and a cutting head 12 and demonstrates its ability to provide a thrust. The cylindrical body 10 of the tunnel boring machine is supported by two polytoroidal thruster assemblies 14 and 16. The toroids 18 (i.e., inflatable bladders) squeeze against the inner wall 20 of the tunnel 16 and hold by friction. FIG. 4a illustrates the toroidal shape of the thruster. Each polytoroidal thruster assembly has a capacity to hold a load L given by:

$$L = \pi D w p \mu$$

where D is the tunnel diameter
  w is the contact surface width
  $\mu$ is the co-efficient of friction
  p is the inflation pressure.

In a large tunneling mole, with the walls trepanned moderately smooth, the potential thrusting force is immense.

The braking capability of an individual thruster assembly is limited to the product of the internal pressure and the cylindrical or frontal area of the interface of the bladders, while the thrusting capability is limited to the product of the internal pressure and the cross-sectional area. A thruster assembly should have sufficient number or braking bladders in contact with the wall 20 to balance these forces. Any more would be inefficient. That is, the number of bladders providing braking force should balance the thrusting force of the thrusting bladder. Thrust increases can be realized when polytoroidal thrust assemblies are staged and when the tunnel cross-section area increases.

One embodiment of the polytoroidal thruster is illustrated in FIG. 1a. In this embodiment, there are three toroid-shaped bladders 22, 24, 26 mounted on a spool, generally indicated at 28, comprised of a cylindrical center 30 and two end plates 32 and 34. The end plates 32, 34 hold the inflatable bladders 22, 24, 26 in place on the cylindrical center 30. The spool 28 can be made of any solid material such as metal, wood or plastic, depending upon the strength required and the application of the thruster.

The cylindrical center 30 may be hollow or solid, depending upon the particular use of the thruster. For use with a tunnel boring machine, it would be hollow to permit attachment as shown in FIG. 4. The toroid-shaped bladders can be made or rubber, a biased fabric or any other suitable flexible material. The material selected will depend upon the strength, size and shape of inflatable bladders needed. Rubber inner tubes may be suitable for small polytoroidal thruster assemblies.

A principal problem, previously mentioned, with these types of devices is the behavior of the inflatable bladders when they are relatively unconstrained. The bladders assume whatever shape is least confining. Thus, if they are too flexible, they can become entwined and, also, an inflated bladder can expand axially and occupy the space of a deflated bladder, thus limiting the net forward motion. That is, as pressure would be released from one bladder, its inflated neighbor would fill the void before an inflating tube could occupy its space. This problem can be alleviated by separating the inflatable bladders with axially movable circular spacers 36 and 38, which partially restrict axial expansion of the bladders. Another corrective measure which can be takes is to carefully regulate the inflation of a deflated bladder while controlling the rate and extent of deflation of an inflated bladder.

An additional modification can be made to completely restrict the axial expansion of the bladders. This modification limits the axial movement of spacers 36 and 38, in some manner, as shown in FIG. 2. In this embodiment, the spool 28 has two end plates 32 and 34, as in the embodiment of FIG. 1, but the cylindrical center 30 is comprised of a plurality of rods 40 forming a cylindrical cage. Axial movement of the spacers 36 and 38 is restricted by two sets of stops 42 and 44. The first set of stops 42 is located midway between the two end plates 32, 34. These stops keep spacers 36, 38 from crossing over center. The second set of stops link spacers 36, 38 together and limit their maximum separation distance. Stops 42 are shown as shoulders in the center of rods 40 forming the cylindrical cage. Stops 44 are shown as flanges on a rod 46 through the center of spacers 36 and 38. Stops 44 could also be provided as shoulders on rods 40 on either side of center, as shoulders on rods spaced between rods 40, or as shoulders in the center, and spaced apart from center, on each alternate rod 40. Numerous other alternatives are available for limiting the axial movement of spacers 36, 38. For example, for a spool 28 having a solid cylindrical center 30 (see FIG. 1), the stops could be ridges, radially extending spikes or fixed plates. It is important, however, that the stops are small enough to prevent any limiting of the axial expansion of the thrusting bladders.

The sequence of operation of the three bladder embodiments of FIGS. 1a and 2 is shown in FIGS. 1b through 1e with some reference numerals omitted for clarity. Only the lower half of the thruster is shown to illustrate the operational sequence. In FIG. 1a, the most forward bladder 22 is deflated. In FIG. 3b, the thruster has advanced one step forward due to the simultaneous deflation of the rear bladder 26 and the inflation of the forward bladder 22. From FIG. 3b to FIG. 3c, the rear bladder 26 was inflated during the simultaneous deflation of the middle bladder 24, and from FIG. 3c to FIG. 3d, the middle bladder 24 was deflated during the simultaneous deflation of the forward bladder 22, thus completing the cycle.

In these embodiments bladders 22 and 26 are the thrusting bladders while bladder 24 is the braking bladder. To reverse the direction of vermicular motion, the sequence of operation would be reversed. That is, the starting position would be as in FIG. 1b with bladder 26 being inflated during the simultaneous deflation or bladder 22. The three bladder embodiment of FIG. 1, while sufficient to illustrate the vermicular motion concept, is not necessarily the optimum for actual operation.

The thruster assembly is operated by selectively inflating one bladder while simultaneously deflating another, as described above. The inflation and deflation operation is performed, as shown in FIG. 4, by providing a source 21, such as a tank or compressor and a solenoid valve assembly 25, which is controlled by a cycle timer 23. Each inflatable bladder is controlled by two valves, one for inflation and one for deflation. Flexible hoses or lines 27 connect the valve assembly to the individual bladders. Preferably the deflated diameter of the bladders is made slightly less than the diameter of the end plates in order to prevent them from dragging.

FIGS. 3a–3f show a four-bladder spool configuration of the polytoroidal thruster assembly and illustrate its operating sequence. In this embodiment, two bladders are inflated at all times with low pressure air. This embodiment has a spool 48 as does the embodiment of FIG. 1a. However, two braking bladders 50, 52 are enclosed in axially movable, spool-shaped sheaves 54, 56 which restrict the axial expansion of these bladders. Thrust is provided by unrestrained bladders 58, 60.

FIGS. 3b–3f merely illustrate the operational sequence with only the lower half shown and some reference numerals omitted for clarity. In FIG. 3a, bladders 50, 52 and 60 are inflated while bladder 58 is deflated. Simultaneously bladder 58 is inflated while bladders 50 and 60 are deflated, as shown in FIG. 3b, causing an advance of one step as bladder 58 inflates while thrusting against sheave 54. The inflation of bladder 50 in FIG. 3c forms a brake to hold the load while bladders 52, 58 deflate and bladder 60 inflates in FIG. 3d. The inflation of bladder 52, as shown in FIG. 3e, results in a repeat of the condition shown in FIG. 3a. The cycle is now complete and the thruster is ready for another advance, as shown in FIG. 3f. In the four-bladder concept, the separation of functions permits the bladders 50, 52, confined in the sheaves 54, 56, respectively, to act as a brake against which the free bladders 58, 60 can thrust.

There are two differences between the three-bladder concept and the four-bladder concept. The first is that the four-bladder concept requires one more step per cycle. That is, there are five steps in the four-bladder concept for a complete cycle, while there are only four in the three-bladder concept. Also, in the three-bladder concept, a greater percentage contact area between inflated bladders and a tunnel wall will be noted.

Figure 5:
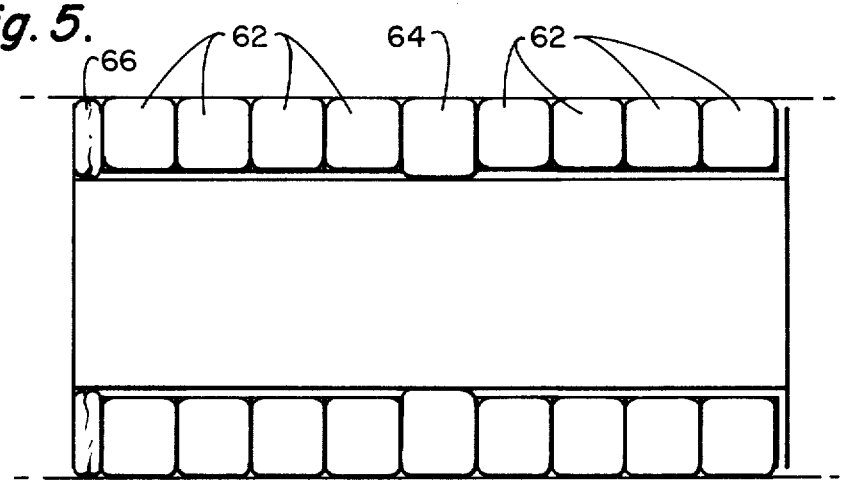
FIG. 5 is a schematic diagram showing a bladder arrangement for balancing braking and thrusting forces.

As noted above, the performance of the polytoroidal thruster assembly is braking force limited. That is, a balanced design requires that the braking force be balanced against the thrusting force. The reason for this is that the braking force is a function of the co-efficient of friction while the thrusting force is not. For example, if the thrusting force of a single bladder is four times the braking force of a single bladder, a balanced design would require four braking bladders for each thrusting bladder. Such an arrangement is shown in FIG. 5. In this cinfiguration, there are four braking bladders, each confined in a sheave, which may or may not be linked together, for each free bladder 64, 66. Thus, for a balanced design, there are two groups of four braking bladders for each free bladder, making a total of eight braking bladders.

Thus, there has been disclosed a polytoroidal thruster assembly which is particularly adaptable for use with tunneling machines but can be adapted for many other applications. Thruster configuration can be varied to meet application requirements. For example, if internal space within the thruster must be conserved, then the toroidal shape of the braking bladders can be changed from rectangular to virtually flat, and thrust can be provided by high pressure rams in the conventional manner, instead of with a thrusting bladder. The change in bladder shape is possible because braking force is dependent only on tunnel wall area contact and is independent of axial cross-sectional area. On the other hand, if overall length must be conserved, then cumulative bladder length can be proportioned to the force required for individual operations. That is, a much longer bladder would be required to brake against cutter thrust and torsional forces than would be required for simple translation within the tunnel. Referring to FIG. 3a, for example, bladder 52 might have a length ten times that of bladder 50.

The working fluid for the polytoroidal thruster assemblies was described as a compressed gas. However, the work to compress that gas could be eliminated if a liquid were used and hydraulic pressure were utilized. It is also possible that performance can be significantly improved by changing the bladder cross-sectional dimensions and its strength. For example, the toroidal cross-section could be round or approximately rectangular. This would increase thrust when polytoroidal spools are staged, as shown in FIG. 4, and when tunnel cross-section area increases. Another possible alternative would be to make the braking bladders out of solid material except for the portion which contacts the tunnel wall, which would be a flexible material. Thus, the spacers shown in FIG. 2 and the sheaves shown in FIG. 3 would become an integral part of the bladder.

Obviously many modifications and variations of the present invention are possible in light of the above teachings. It is therefore to be understood that within the scope of the appended claims the invention may be practiced otherwise than as specifically described.

We claim:

1. A vermiculating polytoroidal thruster assembly comprising:
   a. a spool having a cylindrical center and a pair of disc-shaped end plates;
   b. a plurality of adjacently mounted, toroidal-shaped bladders held between the end plates on the cylindrical center of the spool;
   c. means for selectively inflating and deflating certain bladders simultaneously in a predetermined sequence; and
   d. means for confining the axial expansion of each bladder during inflation.

2. The polytoroidal thruster of claim 1 wherein each bladder has an outisde diameter slightly smaller than the end plates when deflated.

3. The polytoroidal thruster of claim 2 wherein the means for confining the axial expansion of bladders comprises:
   a. cylindrical spacers movably mounted on the cylindrical center of the spool between each bladder; and
   b. means on said spool for limiting the axial motion of the spacers.

4. The polytoroidal thruster of claim 3 wherein the means for limiting the axial motion of the spacers includes stops on either side of each spacer.

5. The polytoroidal thruster of claim 4 wherein there are three adjacent bladders held between the end plates.

6. The polytoroidal thruster of claim 1 wherein the means for confining expansion comprises:
   a. a cylindrical sheave movably mounted on the cylindrical center; said sheave substantially enclosing at least one of the bladders.

7. The polytoroidal thruster of claim 6 wherein there are four bladders held between the end plates.

8. The polytoroidal thruster of claim 7 wherein alternate bladders are enclosed in expansion confining sheaves.

9. In a tunnel boring machine having a rotating cutting head and a cylindrical body, the improvement comprising:
   a. at least one polytoroidal thruster assembly as in claim 1 attached to the outer circumference of the cylindrical body of the boring machine.

10. The apparatus as in claim 9 wherein two polytoroidal thrusters are attached at each end of the cylindrical body of the boring machine.

11. The apparatus as in claim 10 wherein each polytoroidal thruster has three bladders.

12. The apparatus of claim 10 wherein each polytoroidal thruster has four bladders and the alternate bladders are substantially enclosed in movably mounted sheaves so that their expansion is limited.

* * * * *